United States Patent [19]

Yamada et al.

[11] Patent Number: 4,812,845

[45] Date of Patent: Mar. 14, 1989

[54] VEHICLE RUNNING GUIDE SYSTEM

[75] Inventors: Motokazu Yamada, Nagoya; Hideyuki Hayakawa, Nishio; Tomonori Fukui; Hajime Matsuhashi, both of Kariya; Yasuhiro Kaneko, Kariya; Motozo Ikeda, Kariya; Tomihiko Nagata, Oobu, all of Japan

[73] Assignee: Nippondenso Co., Ltd., Kariya, Japan

[21] Appl. No.: 11,366

[22] Filed: Feb. 2, 1987

Related U.S. Application Data

[63] Continuation of Ser. No. 568,795, Jan. 6, 1984, abandoned.

[30] Foreign Application Priority Data

Feb. 24, 1983 [JP] Japan ................... 58-30429

[51] Int. Cl.⁴ .............................. G08G 1/12
[52] U.S. Cl. .................................. 340/995; 73/178 R; 340/988; 364/449
[58] Field of Search ............... 340/996, 988, 995, 990; 73/178 R; 180/169; 364/447, 449, 457, 460, 444

[56] References Cited

U.S. PATENT DOCUMENTS

| | | | |
|---|---|---|---|
| 2,996,137 | 8/1961 | Chu et al. | 364/457 |
| 3,845,289 | 10/1974 | French | 340/996 |
| 3,925,641 | 12/1975 | Kashio | 340/996 |
| 3,984,806 | 10/1976 | Tyler | 340/988 |
| 4,190,819 | 2/1980 | Burgyan | 340/996 |
| 4,291,373 | 9/1981 | Mizote et al. | 340/996 |
| 4,530,237 | 7/1985 | Barriac | 73/178 R |
| 4,535,335 | 8/1985 | Tagami et al. | 364/449 |

FOREIGN PATENT DOCUMENTS

| | | | |
|---|---|---|---|
| 2727311 | 12/1978 | Fed. Rep. of Germany | 340/996 |
| 3222283 | 1/1983 | Fed. Rep. of Germany | |
| 8002209 | 10/1980 | France | |
| 1332934 | 10/1973 | United Kingdom | |
| 1414490 | 11/1975 | United Kingdom | |
| 2011687 | 7/1979 | United Kingdom | |
| 2013890 | 8/1979 | United Kingdom | |
| 2130374 | 5/1984 | United Kingdom | 340/996 |

Primary Examiner—Joseph A. Orsino
Assistant Examiner—Brent A. Swarthout
Attorney, Agent, or Firm—Cushman, Darby & Cushman

[57] ABSTRACT

A running guide system for an automotive vehicle planned for running in a sightseeing area or the like. Special running data including right or left turn, passage through a tunnel, running in a predetermined direction and passage on a slope are stored in a cassette tape together with distance data representing the distance from a start point in the form of a plurality of check point data. By collation of the running distance data actually measured and the special running condition data with the stored data, the automobile is guided audibly or visually. Geographical data or sightseeing data are also recorded in the cassette tape and reproduced in voice from time to time. When the automobile is displaced from the planned running route, an alarm is issued. When the automobile is restored to the planned running route, the planned running guide is restored.

17 Claims, 7 Drawing Sheets

VEHICLE RUNNING GUIDE SYSTEM

This is a continuation of application Ser. No. 568,795, filed Jan. 6, 1984, which was abandoned upon the filing hereof.

BACKGROUND OF THE INVENTION

The present invention relates to an automotive vehicle drive or running guide system in which the vehicle is guided through a plurality of check points arranged along a planned running route.

Conventionally, in driving along a predetermined route in a sightseeing area or the like, the vehicle is often diverted from the route even when driving with reference to a map if the route has never been experienced by the driver.

SUMMARY OF THE INVENTION

The present invention has been developed in view of this point and the object thereof is to provide a vehicle running guide system in which a plurality of check points are arranged along a planned running route. A guide to those check points is announced and/or the fact whether or not those check points have been passed is confirmed.

According to a typical aspect of the present invention, there is provided a vehicle running guide system comprising means for storing data on a plurality of check points including the starting point along a planned running route. Distance data specifying the positions of the check points, or guide data may be provided for guiding the driver to the check points. Alternately, data for indicating special conditions of the vehicle at each check point may be used. First decision means can read distance data to the next check point at a predetermined timing from the memory means. Means for detecting the distance covered by the vehicle on the basis of a distance signal produced from distance detector means, means for detecting a predetermined detection region of the special conditions of the vehicle and/or the time point of the guide data to the check point from the relation between the distance covered and the distance data to the next check point read as above, means for announcing a guide notice on the basis of the guide data on the particular check point stored in the memory means in response to the decision on the time point of guide to the check point, and second decision means for deciding whether or not the special conditions of the vehicle are detected by the detector means when the detection region of the special conditions is decided by the first decision means, the announcing means issuing a notice that the vehicle has been displaced from the planned route if it is decided that the special conditions of the vehicle are not detected in the detection region.

Further objects, features and advantages of the present invention will be apparent from the following description taken in conjunction with the accompanying drawings, in which:

DESCRIPTION OF THE PREFERRED EMBODIMENT

Figure 1:
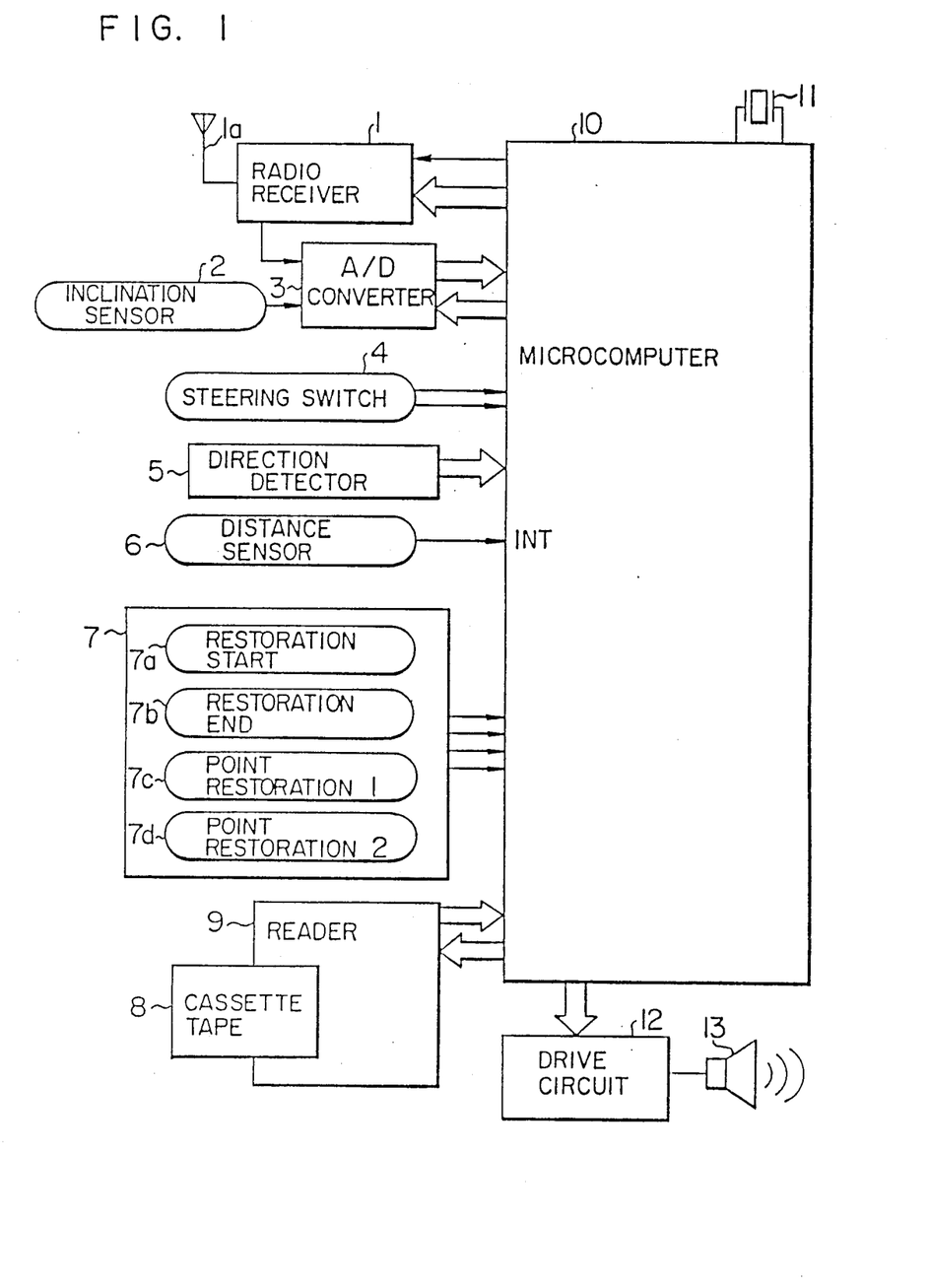
FIG. 1 is a block diagram showing an embodiment of the present invention.

In FIG. 1, reference numeral 1 designates a radio receiver for entering a receiving mode in response to an external radio-on signal. In receiving mode, a signal from an antenna is received while at the same time producing a receiving signal (a signal smoothed to some degree over a time length) indicating the receiving mode. Numeral 2 designates an inclination sensor for detecting the inclination angle of the automotive vehicle, numeral 3 an A/D converter for converting an inclination detection signal produced from the inclination sensor 2 and a receiving signal produced from the radio receiver 1 into a digital signal. Numeral 4 designates a steering switch for detecting the right and left operating conditions of the vehicle steering system, which is adapted to be turned on when the steering system is operated by more than a predetermined angle rightward or leftward. Numeral 5 designates a direction detector for detecting the direction in which the car proceeds. Numeral 6 designates a distance sensor for producing a distance pulse each time the vehicle has covered a unit distance. Numeral 7 designates a keyboard including keys 7a to 7d (of self-restoration type) which are operated when the vehicle is to be restored or has been restored to a planned running route after being displaced therefrom.

Figure 2:
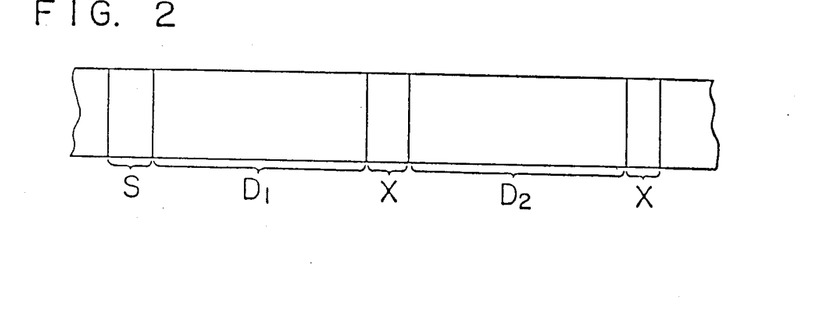
FIG. 2 is a diagram for explaining the data storage area of a cassette tape.

Numeral 8 designates a cassette tape for storing data about a plurality of check points from the starting point along the planned running route. As shown in FIG. 2, this cassette tape stores a data area S representing the starting point. The check point data $D_1$, $D_2$ and so on follow with a blank section between each pair of adjacent check point data. These check point data are comprised of distance data indicating positions of the check points, guide data for guiding to the check points and/or condition data indicating special conditions (right or left turn condition, passing through a tunnel, passing under a high voltage transmission cable, running in a predetermined direction or running along a slope) of the vehicle at the check points. Numeral 9 designates a reader for reading the check points $D_1$ and so on sequentially by controlling the reading condition of the cassette tape 8.

Numeral 10 designates a microcomputer for executing a digital operation using software according to a predetermined program, and including a CPU, a ROM, a RAM, an I/O circuit and a clock generator. The microcomputer 10 is connected to a crystal oscillator 11, and is actuated in response to a stabilized voltage of 5V supplied from a car battery through a stabilized power supply circuit (not shown), so that guide data for effecting a guided drive to a predetermined check point is produced to a drive circuit 12. Also, the microcomputer 10 applies alarm voice data to the drive circuit 12 for issuing a voice alarm when it is decided that the vehicle has been displaced from the planned running route.

Numeral 12 designates a drive circuit for producing a guide voice or an alarm voice by way of a speaker 13 (installed near the driver's seat in the forward part of the cabin) in response to guide data or alarm voice data from the microcomputer 10.

In this configuration, the operation of the system will be explained with reference to the diagrams of FIGS. 3 and 4 and the operation flowcharts of FIGS. 5 to 10.

Figure 3:
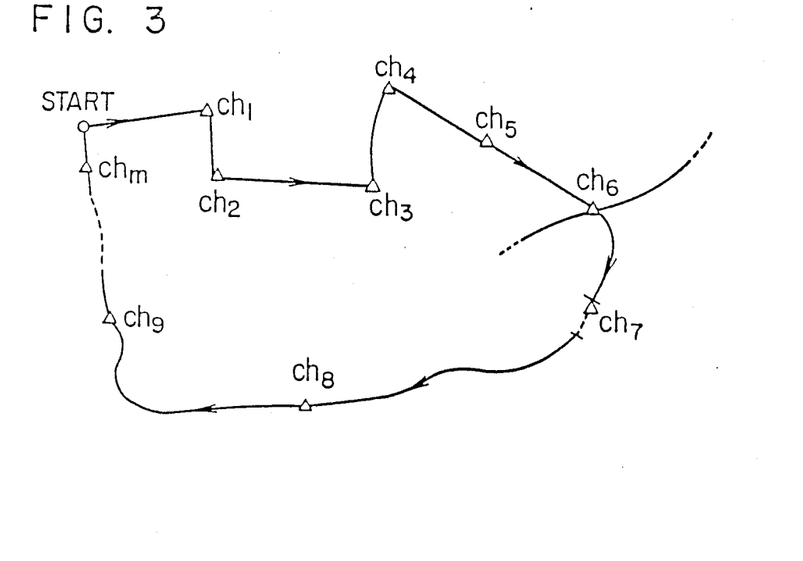
FIGS. 3 and 4 are diagrams for explaining the running route in operation.

Assume that an automotive vehicle having the component elements 1 to 13 in FIG. 1 is to go around a sightseeing area along a running route as shown in FIG. 3. A plurality of check points along the running route are set in the cassette tape 8. When the cassette tape 8 is inserted into the reader 9, the microcomputer 10 begins the operating processes from a start step 100 in FIG. 6. The process then proceeds to step 101 for initializing a register, a counter and a latch in the microcomputer 10 as required by the operating processes. This initialization includes the operation for setting a distance difference data $\Delta d$ to zero and the operation of resetting a restoration flag. At step 102, the cassette tape 8 is rewound by the reader 9, while at the same time the data is read from the cassette tape 8 through the reader 9, so that when the data region S indicating the starting point is read, the rewinding of the cassette tape 8 is stopped. From this time point, the operating process for the drive guide of the planned running route, that is, the operating process of the main routine is executed.

In the operating process of the main routine, step 103 reads the data on the next check point. Specifically, the cassette tape 8 is set to the reproduction mode by the reader 9 to read the data, while at the same time temporarily storing the data in RAM. The reproduction operation of the reader 9 is stopped at the time point when the next blank X is detected. The distance data to the next check point among the data thus read is called a set distance data ds. In the first operation, the check point data $D_1$ of FIG. 2 is real. This includes data indicative of a right-turn at the first check point $ch_1$ as shown in FIG. 3, the planned car direction data $\theta_1$ after turning right, and guide data on how to turn to the right at the intersection XX is read and stored in RAM. The process is then passed to step 104, where the set distance data ds is corrected using the distance difference data $ds = ds + \Delta d$. This correction is made to obtain an accurate distance between the car position read and stored at step 103 and the next check point, in view of the fact that a set distance data ds included in a check point data represents a distance between check points. However, if the check point involved is a place, as mentioned later, for effecting a building guide alone or checking straight progress or vehicle inclination, the time point read at step 103 is not necessarily coincident with the time when the particular check point is passed. Since $\Delta d$ is set to zero by initialization at the time of the first arrival, the set distance data ds remains the same as read in this initial operation. The process proceeds to step 105 where the running distance data D is reset to zero, followed by step 106 for setting the distance error data $\Delta d$ to the set distance data ds. Then at step 107, it is decided whether or not the distance error data $\Delta d$ has been reduced to a value lower than X m (such as 100 m), and the process stands by until $\Delta d$ and decreases below X m.

Figure 5:
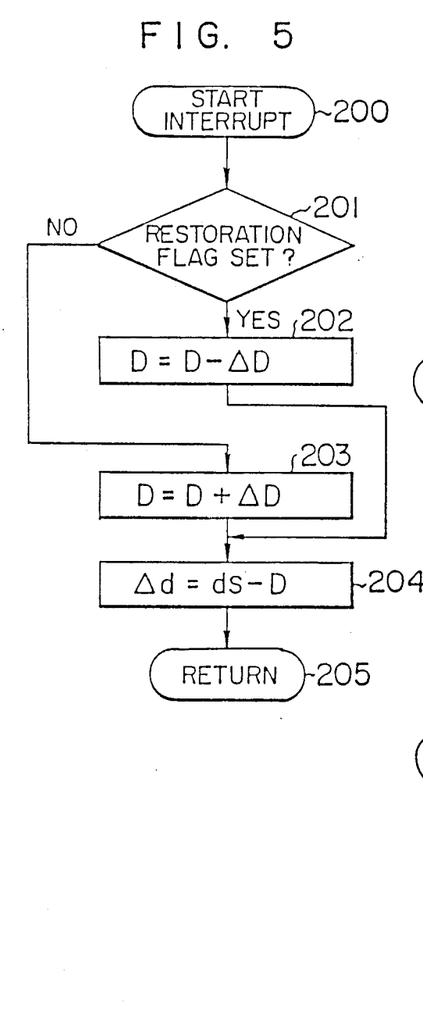
FIGS. 5 to 10 are flowcharts showing the operating processes of a microcomputer.
Figure 6:
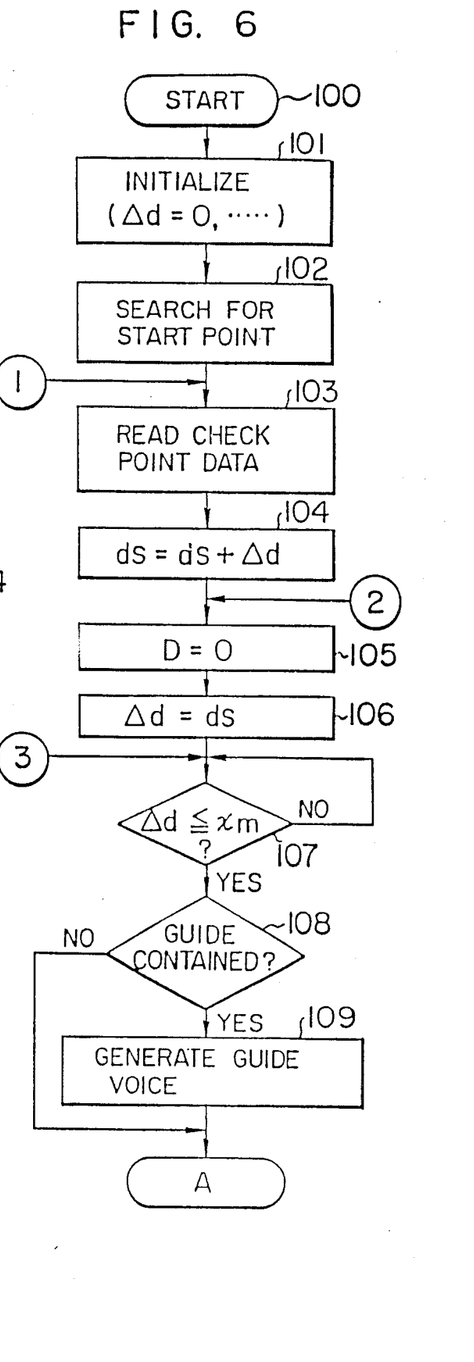

In addition to this operating process of the main routine, the microcomputer 10 interrupts the main routine and executes the operating process shown in FIG. 5 each time the interruption terminal (INT) of the microcomputer 10 is impressed with a distance pulse from the distance sensor 6 by the coverage of the unit distance. Specifically, the interrupt start step 200 starts the interruption operating process, and step 201 determines that the restoration flag has been reset by the initialization. Since the answer at step 201 is "No", the process passes to step 203, where the unit distance data $\Delta D$ corresponding to the unit distance is added to the running distance data D, followed by step 204 where the distance error data $\Delta d$ is determined by the calculation $\Delta d = ds - D$. The process is then passed to step 205 where the operating process of the main routine that was once interrupted is restored. Thus, by the execution of the interruption operating process with the distance coverage of the car, the distance error data $\Delta d$ is steadily reduced.

When the point X m before the first check point $ch_1$ is reached, the distance error data $\Delta d$ becomes equal to or less than X m, and therefore the decision at step 107 is "Yes". The process then proceeds to step 108 to decide whether or not the check point data $D_1$ read previously, includes any guide data. Since the guide data is included, the decision is "Yes", and the process passes the guide data is applied to the drive circuit 12. By this operation, the drive circuit 12 drives the speaker 13 to issue a voice saying "Turn right at intersection XX" to the driver in the cabin.

Figure 7:
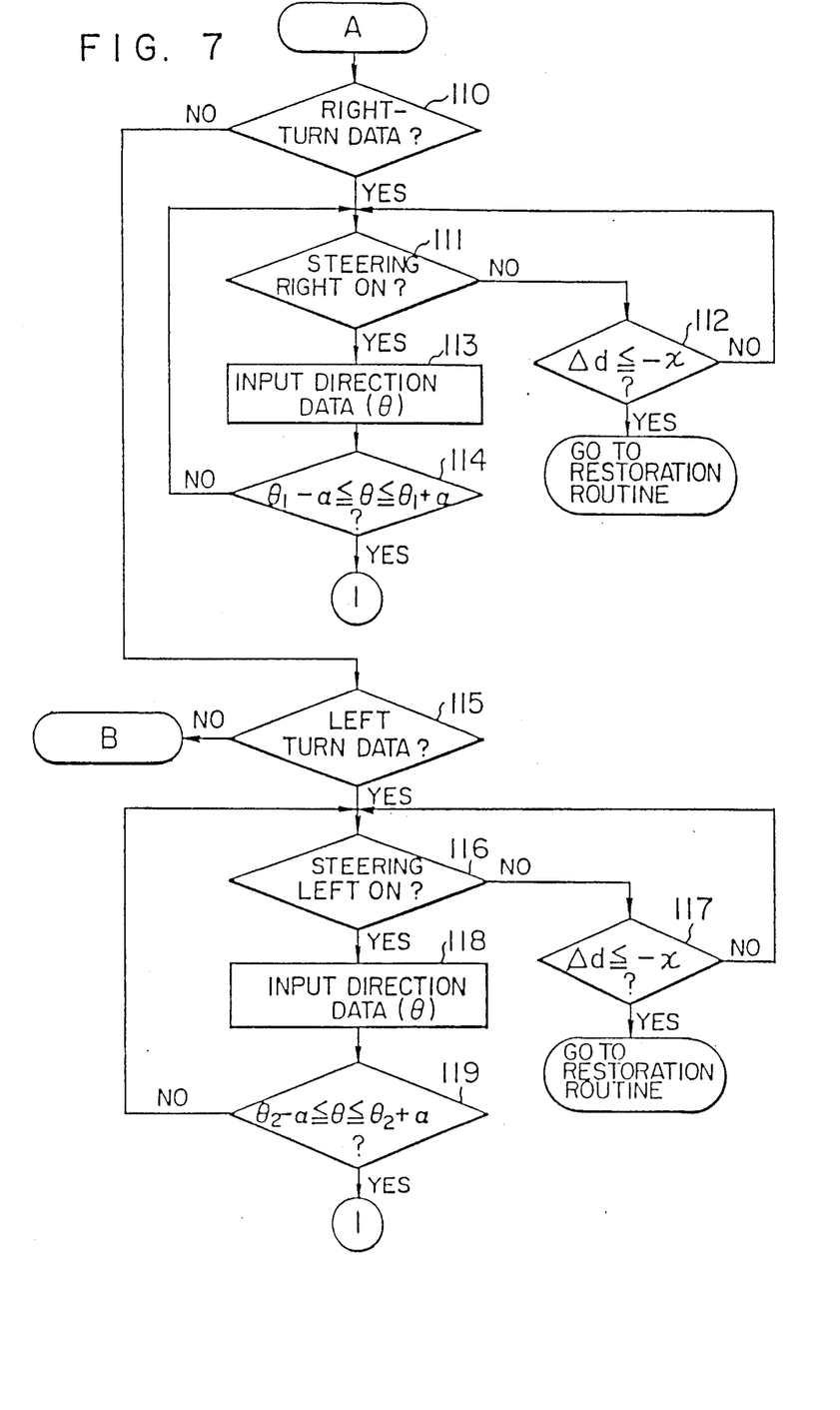

Following step 109, the process is passed to step 110 in FIG. 7 to decide whether or not the check point data $D_1$ contains right turn data. Since the right turn data is included, the answer at step 110 is "Yes". The process proceeds then to step 111. If the point of right turn is not yet reached and the steering system is not operated rightward more than a predetermined angle, the operating cycles from step 111 via step 112 to step 111 are repeated.

Subsequently when the steering system is operated rightward more than the predetermined angle to turn right at the intersection XX, a signal indicating the right turn operation is produced from the steering switch 4, thus making the decision "Yes". The process is then passed to step 113, where the direction data 8 indicating the running direction of the car is applied from the direction detector 5, and it is decided whether or not this direction data $\theta$ is included in the range of $\pm \alpha$ based on the planned running direction data $\theta_1$ read and stored at step 103. If the direction data $\theta$ is included in the range, it is decided that the car has not failed to turn right at the intersection XX to produce the answer "Yes", followed by return to step 103 in FIG. 6. (If the decision at step 103 is "No", it is decided that the right turn is not involved at the check point, and the process is returned to step 111 to resume detection of right turn).

At this step 103, the data $D_2$ on the next check point $ch_2$ is read and stored. This check point $ch_2$ involves the left turn as shown in FIG. 3, and therefore the check point data $D_2$ includes the planned running direction data $\theta_2$ of the car after the right turn as well as the right turn data, and also the guide data for indicating the left turn at the intersection $\Delta\Delta$. After step 103, the process is passed to step 104, where the set distance data ds is corrected, and after correction, the process is passed from step 105 through step 106 to step 107 to stand by.

Subsequently when the point X m before the check point $ch_2$ is reached and the answer at step 107 becomes "Yes", the process is passed through step 108 to step 109 for applying guide data to the drive circuit 12. By this operation, the drive circuit 12 drives the speaker 13 to announce a voice saying "Turn left at the intersection $\Delta\Delta$" to the driver in the cabin.

Following step 109, the operating process of FIG. 7 is performed. At this time, since the check point data $D_2$ contains the left turn data but not the right turn data, the decision at step 110 is "No", and the process is passed to step 115 where the answer is "Yes". The operating processes from step 116 to 119 (corresponding to the operating processes from 111 to 114 for right turn) are executed to confirm that the car is turned to the left at check point ch2. When the fact that the car has turned to the left is confirmed (i.e., when the step 119 is reached and the decision there is "Yes"), the process is returned to step 103 in FIG. 6 to start the running guide to the next check point.

In similar fashion, the operating processes are performed for the check points ch3 and ch4 to guide the car as to right or left turn and to confirm that the car has actually turned right or left. At the check point ch5, only the target (such as the name of a building or bridge) is indicated. In this case, the check point data includes only the guide data in addition to the set distance data ds, and therefore, after step 109 for indication of the data, all the answers at steps 110, 115 in FIG. 7 steps 120, 129 in FIG. 8 and steps 138, 142 in FIG. 9 are "No", so that the process is returned to step 103 in FIG. 6 to start the running guide for the next check point.

The next check point ch6 indicates the passage under a high voltage transmission cable, so that the corresponding check point data includes cable data, the radio set receiving frequency $f_1$, the receiving level $V_1$ for deciding passage under the cable, and the guide data on the high voltage transmission cable. When the decision of step 107 becomes "Yes" at the point X m before the check point ch6, the process is passed through step 108 to step 109 for applying the guide data to the drive circuit 12. Then, the drive circuit 12 drives the speaker 13 to announce a voice "Watch a high voltage transmission cable".

Figure 8:
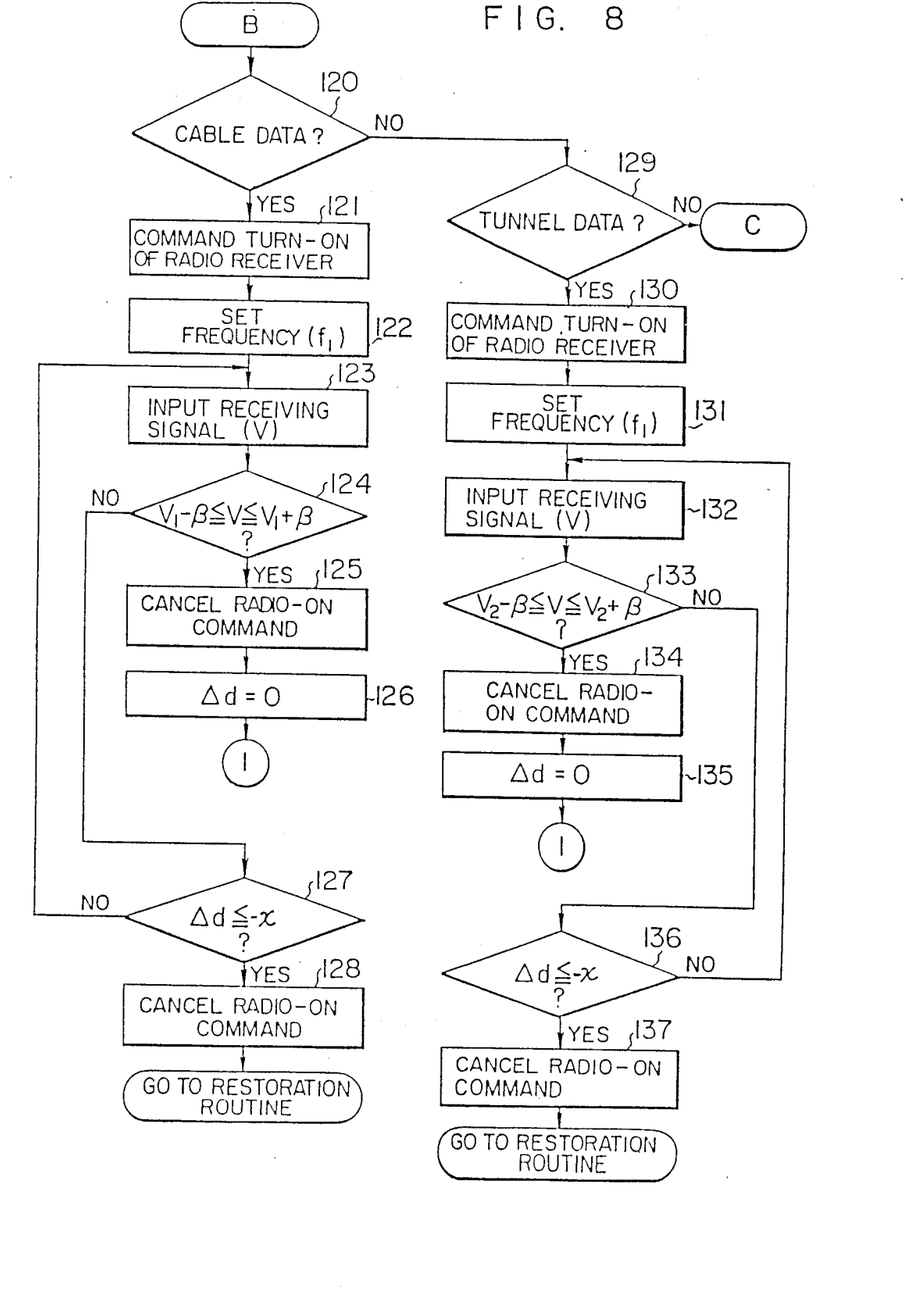
Figure 9:
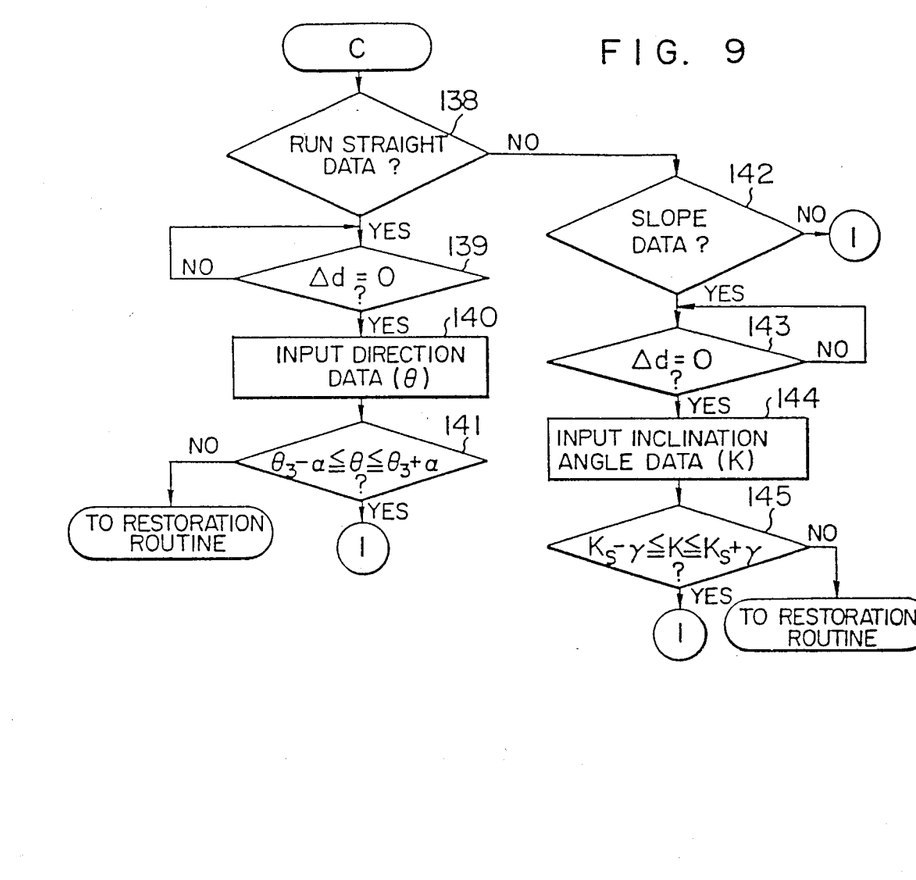

The processes are then passed from step 109 through steps 110 and 115 in FIG. 7 to step 120 in FIG. 8, where the decision is "Yes" since the check point data includes the cable data. Then at step 121, a radio-on command is issued to the radio receiver 1, followed by step 122 for setting the receiving frequency $f_1$ of the radio receiver 1. By doing so, the receiving operation is effected by the radio receiver 1 turned to the receiving frequency $f_1$ as designated. The process is then passed to step 123 where the receiving signal is applied from the radio receiver 1 through an A/D converter 3 (the data thus applied is called the receiving data V), followed by step 124 for deciding whether or not the receiving data V is included in the range of $\pm\beta$ based on the receiving level $V_1$ for decision. If the receiving data V is not included in that range or the point X m from the check point ch6 is not passed, the operating process for returning to step 123 are repeated.

Subsequently when the high voltage transmission cable is passed and the receiving level V comes to be included in the range of $\pm\beta$ at step 123, the decision at step 124 becomes "Yes". Then the process is passed to step 125 where the application of the radio-on command signal to the radio receiver 1 is cancelled, followed by step 126 where the distance error data Δd is set to zero and the process is returned to step 103 in FIG. 6. In this way, the receiving operation of the radio receiver 1 is stopped. Also, since the time of passing under the high voltage transmission cable is an accurate time of passing the check point, the distance error data Δd is reduced to zero for accurate correction of the distance error data Δd.

The next check point ch7 involves the passage through a tunnel and the corresponding check point data includes the tunnel data, the radio set receiving frequency $f_1$, and the receiving level $V_2$ of deciding the passage through the tunnel. Assume that the tunnel guide data is not included. When the decision at step 107 becomes "Yes" at the point X m before the check point ch7, step 129 is reached from steps 108 through steps 110, 115 in FIG. 7 and step 120 in FIG. 8. Since the check point data includes the tunnel data, the decision at step 129 is "Yes". The process is passed to steps 130 and 131 where the same operating processes as at steps 121 and 122 are executed so that the radio receiver 1 performs the receiving operation turned to the receiving frequency $f_1$. Also, at step 132, the receiving data V is received, followed by step 133 for decision as to whether or not the receiving data V is included in the range of $\pm\beta$ based on the receiving level $V_2$ for decision. If the tunnel is entered and the receiving level V falls on the range $V_2\pm\beta$, then the decision at step 133 becomes "Yes", so that the operating processes of steps 134 and 135 (similar to those of steps 125 and 126) are executed and the process is then returned to step 103 for starting the running guide for the next check point.

The next check point ch8 indicates the straight running conditon, and the corresponding check point data includes the straight running data and the planned direction data $\theta_3$ of the straight road. When the decision of step 107 becomes "Yes" as the car reaches the point X m before the check point ch8, the process is passed from step 108 to step 138 via steps 110, 115 in FIG. 7 and steps 120, 129 in FIG. 8. And at this step 138, the decision is "Yes" since the check point data includes the straight running data, followed by step 139 where the distance error data Δd is reduced to zero. Specifically, the process is held at step 139 until the decision is made that the check point has been passed. When the decision at step 139 becomes "Yes", the process proceeds to step 140 where the direction data $\theta$ is applied from the direction detector 5, followed by step 141 where it is decided whether or not the direction data $\theta$ is included in the range of $\pm\alpha$ from the planned direction data $\theta_3$ of the straight road. If the car is running along this straight road and the decision at step 141 becomes "Yes", the process is returned to step 103 in FIG. 6 for starting the running guide for the next check point.

The next check point ch9 indicates the running condition or a slope, and the corresponding check point data includes the inclination data and the planned inclination angle data Ks. When the car reaches the point X m before the check point ch9 and the decision at step 107 becomes "Yes", the process is passed from step 108 through steps 110, 115 in FIG. 7 and steps 120, 129 in FIG. 8 and step 138 in FIG. 9 to step 142. Since the check point data includes the inclination data, the decision at step 142 becomes "Yes", followed by step 143 where the process is held until the distance error data Δd is reduced to zero. When the check point ch9 is passed and the decision at step 143 becomes "Yes", then the process is passed to step 144 where the inclination angle data K is applied from the inclination sensor 2 via the A/D converter, followed by step 145 where it is decided whether or not the inclination data K is included in the range of $\pm\gamma$ from the planned inclination data Ks. If the car is running along this slope and the decision becomes "Yes" at step 145, the process is returned to step 103 in FIG. 6 for starting the running guide for the next check point.

The processes mentioned above are executed to guide the car in accordance with each of the various check points until the car returns to the starting point.

The case in which the car has run along the planned route accurately was explained above. Now, explanation will be made of the case in which the car is displaced from the planned running route.

In the event that the car is displaced from the planned running route, it is restored to the original route in any of the following three ways.

Figure 4:
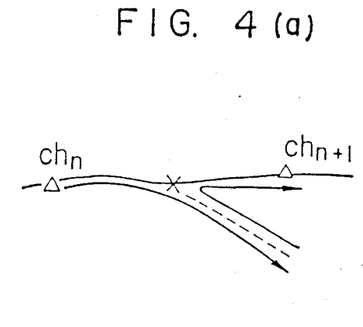

(1) As shown in FIG. 4 (a), the car is displaced from the planned route along a dotted line, which dotted line is subsequently followed backward to return to the planned track.

(2) As shown in FIG. 4 (b), the car is displaced from the planned running route at a check point, and is restored to the particular check point.

(3) As shown in FIG. 4 (c), the car is displaced from the planned running route midway before the next check point, and is restored to the preceding check point for lack of knowledge how to return to the planned running route.

A case of displacement from the planned running route is detected when (a) Until the point X m before the check point is reached, the car fails to turn to the right or left at a predetermined intersection, so that the decision at step 112 or 117 in FIG. 7 becomes "Yes".

(b) Until the point X m before the check point is reached, the high voltage transmission line is not passed, so that the decision at step 127 in FIG. 8 becomes "Yes".

(c) Until the point X m before the check point is passed, the car fails to enter the tunnel so that the decision at step 136 in FIG. 8 becomes "Yes".

(d) The running direction of the car is considerably different from the planned running direction at the check point of straight road, so that the decision at step 141 becomes "No".

(e) The inclination angle of the car is considerably different from the planned inclination angle at the check point of a slope, so that the decision at step 145 in FIG. 9 becomes "No."

Figure 10:
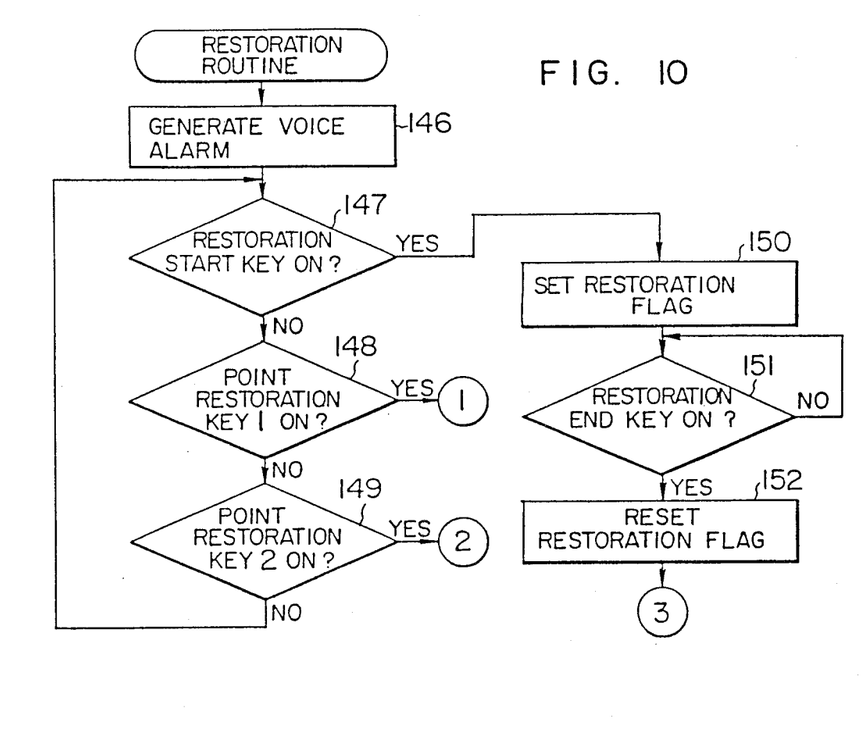

In any of the above cases, the process is advanced to the restoration routine in FIG. 10. (If the decision at steps 127, 136 in FIG. 8 is "Yes", the process is passed to the restoration routine only after execution of the operating processes of steps 128, 137.)

At this restoration routine, step 146 first applies an alarm voice data stored in ROM to the drive circuit 12, and then the operating condition of the keyboard is monitored by the decision processes of steps 147 to 149. The alarm voice data is used by the drive circuit 12 to drive the speaker 13 thereby announcing a voice "You are running along a wrong road." to the driver in the car.

In the case where the point where the car is displaced from the correct route can be estimated and the car is to be restored to the planned running route midway of the wrong road as shown in FIG. 4 (a), the restoration start key 7a of the keyboard 7 is operated at the time when the restoration is made. Then at the restoration routine in FIG. 10, the decision at step 147 becomes "Yes" when the process reaches the particular step, followed by step 150 where the restoration flag is set. Then at step 151, the process is held waiting for the operation of the restoration end key 7b. In this restoration, the prevailing distance error data $\Delta d$ (representing the distance to the next check point) is required to be corrected so that the corrective operation is performed by the interrupt operation in FIG. 5. Specifically, when the process reaches step 201 by the running for restoration, the decision at step 201 is "Yes" since the restoration flag is set, followed by step 202 where the unit distance data $\Delta D$ is subtracted from the running distance data D for updating the data. Then the process is passed to step 204 to determine the distance error data $\Delta d$, followed by step 205. By doing so, the distance error data $\Delta d$ is increased and approaches a value associated with the restoration to the planned running route.

When the car reaches the point X where the car is displaced from the running route, and the restoration ends, then the restoration end key 7b of the keyboard 7 is operated. The decision at step 151 in FIG. 10 becomes "Yes", so that the process is passed to step 152 to reset the restoration flag. The process then proceeds to step 107 in FIG. 6 to restore to the running guide for the next check point. Since the restoration flag is reset, the interrupt operating process in FIG. 5 is restored to the original process by being returned from the interrupt start step 200 via steps 201, 203 and 204 to the return step 205.

Also, when the next check point is accurately reached after displacement from the planned running route as shown in FIG. 4 (b), the point restoration key 7c of the keyboard 7 is operated. When the process reaches step 148 in FIG. 10, the decision thereof is "Yes", so that the process is returned to step 103 in FIG. 6 to start the driving guide for the next new check point.

When as shown in FIG. 4 (c), the route to the next check point is unknown after displacement from the planned running route and the car returns to the preceding check point, on the other hand, the point restoration key 7d of the keyboard 7 is operated. Then, when the step 149 of FIG. 10 is reached, the decision thereof is "Yes", so that the process is returned to step 105 in FIG. 6 to start the running guide for the next check point again.

In the above-mentioned embodiment, check point data on a plurality of check points along a planned running route in a sightseeing area or the like are stored in a cassette tape. As an alternative to this method, the user may prepare and input the check point data of his own for a planned running route determined by himself to use them for running guide.

Also, instead of a voice used above for announcing the running guide, a display such as CRT may be used.

Further, in place of the digital operation by software of the microcomputer described above, a hardware logic configuration of electronic circuits may be used with equal effect.

It will be understood from the foregoing description that according to the present invention, a plurality of check points are provided along a planned running route, and the guide announcement for a check point is capable of being effected from the relation between distance to the check point and the running distance of the car. Also, for a predetermined check point, it is decided whether or not the car has passed the particular check point. It is thus possible to confirm whether or not the car is running accurately along the planned running route. Furthermore, when it is decided that the car has been displaced from the planned running route, an announcement to that effect is made. In this way, the car is capable of being restored to the planned running route in compliance with the alarm without continuing to run along a wrong route displaced from the planned running route.

We claim:

1. A running guide system for a vehicle in which said vehicle is guided along a predetermined running route on which a plurality of check points including a start point are point, comprising:

distance detector means for detecting a running distance traveled by said vehicle and producing a running distance signal indicative thereof;

memory means having check point data indicating said plurality of check points stored therein, said check point data including distance data ds indicating respective relative positions between the check points, and condition data indicating a specific running condition of said vehicle at said check points, for use in checking whether said vehicle has been displaced from said running route at points adjacent one of said check points;

condition detector means for detecting a running condition of said vehicle;

computer means including:
   (1) reading means for reading said distance data ds from said memory means;
   (2) correcting means for correcting said distance data ds, when said vehicle is positioned at one of said checkpoints, by adding distance error data Δd, indicative of a distance error between a previous distance between two checkpoints and a previous distance data ds indicative of said distance between said two checkpoints, to said distance data ds to form corrected distance data ds';
   (3) setting means for setting said distance error data Δd to equal said corrected distance data ds';
   (4) reducing means for reducing said distance error data Δd in accordance with said running distance signal from said distance detector means;
   (5) first decision means for determining whether said distance error data set by said setting means has been reduced to a value lower than a predetermined value;
   (6) second decision means for accessing said memory means to determine a checkpoint and a first specific running condition indicative thereof, and for determining whether said running condition detected by said condition detector means is said first specific running condition when said first decision means determines that the distance error data has been reduced to said predetermined value; and
   (7) information means for providing alarm information indicating that the vehicle is out of said predetermined running route when said second decision means determines that said first specific running condition of the vehicle is not detected by said condition detector means.

2. A system as in claim 1 further comprising a radio receiver which receives radio transmissions.

3. A system according to claim 2, wherein said specific running condition includes the condition of passage of the vehicle through a tunnel, and said condition detector means detects a first abnormal reception of said radio receiver during said passage.

4. A system according to claim 2, wherein said specific running condition includes the condition of passage of the vehicle under a high voltage transmission cable, and said condition detector means detects a second abnormal reception of said radio receiver during said passage.

5. A system according to claim 1, wherein said information means includes a voice generator.

6. A running guide system for a vehicle in which said vehicle is guided along a predetermined running route on which a plurality of check points including a start point are provided comprising:

distance detector means for detecting a running distance traveled by said vehicle and producing a distance signal indicative thereof;

memory means having check point data indicating said plurality of check points stored therein, said check point data including distance data ds indicating respective relative positions of the check points, and condition data indicating a stored specific condition of said vehicle at said check points;

condition detector means for detecting a specific condition of said vehicle;

first decision means for reading distance data from said memory means for a next check point, from said memory means at a predetermined timing, accumulating a running distance of the vehicle on the basis of a distance signal generated by said distance detector means, and determining a region of detecting said specific condition based on a comparison between the distance data read-out to the next check point and the accumulated running distance;

second decision means for determining whether said specific condition detected by said condition detector means corresponds to said stored specific conditions of the vehicle, during a time interval in which said first decision means determines said region of detecting said specific condition;

announcing means for announcing that the vehicle is out of said predetermined running route, when said second decision means determines that the stored specific condition of the vehicle in said region of detection is not detected by said condition detector means;

first instruction means for generating instructions to start a restoration to said predetermined running route when said vehicle is out of the predetermined running route, and to end said restoration when the vehicle returns to said predetermined running route;

first restoration control means for correcting said running distance of the vehicle obtained in said first decision means by decreasing said running distance based on the distance signal from said distance detector means, during a time period between generation of said start instruction and generation of said end instruction, when said second decision means determines that said stored specific condition of the vehicle in said region of detection has not been detected.

7. A system according to claim 6, wherein said specific running condition includes the conditions of right turn and left turn of the vehicle, and said condition detector means detects the operations of turning-right and turning-left of a steering system of the vehicle.

8. A system according to claim 6, wherein said specific running condition includes the condition of a straight run in a predetermined direction, and said condition detector means detects said straight run of the vehicle in said predetermined direction.

9. A system according to claim 6, wherein said specific running condition includes the condition of passage along a slope of a predetermined inclination angle, and said condition detector means detects an inclination angle of the vehicle during said passage.

10. A system according to claim 6, wherein said memory means includes cassette tape means.

11. A system according to claim 6, wherein said distance data represents a distance between check points, and said first decision means obtains the running distance of the vehicle from a last check point.

12. A system according to claim 11, wherein said first decision means determines said region of detecting the specific condition based on a difference between as distance from said last check point to said next check point and a running distance of the vehicle from said last check point.

13. A system according to claim 12 wherein said region of detecting the specific condition is determined when said difference is within a predetermined distance.

14. A system according to claim 11, further comprising:
second instruction means for commanding an initiation of a restoration to said last check point; and
second restoration control means for determining said region of detecting the specific condition by setting the running distance of the vehicle obtained by said first decision means to zero upon generation of said restoration command from said second instruction means, after said second decision means determines that the specific condition of the vehicle in said region of detection has not been detected.

15. A system according to claim 11, further comprising:
second instruction means for commanding a restoration to said next check point; and
second restoration control means for detecting a check point after said next check point, upon generation of said restoration instruction from said second instruction means when said second decision means determines that the region of detecting the specific condition of the vehicle has not been detected.

16. A running guide system for a vehicle in which said vehicle is guided along a predetermined running route on which a plurality of check points, including a start point, are provided, comprising:
distance detector means for detecting a running distance traveled by said vehicle and producing a running distance signal indicative thereof;
memory means having check point data indicating said plurality of check points stored therein, said check point data including distance data indicating respective relative positions of the check points, guide data for guiding between the check points and condition data indicative of a passage of said vehicle through a tunnel;
a radio receiver for receiving radio reception;
condition detector means for detecting a specific running condition of said vehicle by detecting a first abnormal reception of said radio receiver during said passage;
computer means including:
first decision means for: (1) reading a first distance data indicating a distance between a current check point and a next check point from said memory means at a first predetermined time, (2) accumulating a running distance of the vehicle on the basis of a distance signal generated by said distance detector means, and calculating distance error data representing a difference between the running distance and said first distance data, and (3) determining whether said distance error data is smaller than a predetermined value, and
second decision means for determining whether said condition detector means has detected said first abnormal reception during a same time interval during which said first decision means determines that said distance error data is smaller than said predetermined value; and
information means for providing guide information for said next check point when said second decision means determines that said condition detector means has detected said first abnormal radio reception, and for providing alarm information indicative of the vehicle being out of said predetermined running route when said second decision means determines that said first abnormal radio reception is not detected by said condition detector means.

17. A running guide system for a vehicle in which said vehicle is guided along a predetermined running route on which a plurality of check points including a start point are provided, comprising:
distance detector means for detecting a running distance traveled by said vehicle and producing a running distance signal indicative thereof;
memory means having check point data indicating said plurality of check points stored therein, said check point data including distance data indicating respective relative positions of the check points, guide data for guide between the check points, and condition data indicative of a passage of said vehicle under a high voltage transmission cable;
a radio receiver for receiving radio reception;
condition detector means for detecting a specific running condition of said vehicle by detecting a specific running condition of said vehicle by detecting a first abnormal reception of said radio receiver during said passage;
computer means including:
first decision means for: (1) reading a first distance data indicating a distance between a current check point and a next check point from said memory means at a first predetermined time, (2) accumulating a running distance of the vehicle on the basis of a distance signal generated by said distance detector means, and calculating distance error data representing a difference between the running distance and said first distance data, and (3) determining whether said distance error data is smaller than a predetermined value, and
second decision means for determining whether said condition detector means has detected said first abnormal reception during a same time interval during which said first decision means determines that said distance error data is smaller than said predetermined value; and
information means for providing guide information for said next check point when said second decision means determines that said condition detector means has detected said first abnormal radio reception, and for providing alarm information indicative of the vehicle being out of said predetermined running route when said second decision means determines that said first abnormal radio reception is not detected by said condition detector means.

* * * * *